US 8,433,193 B2

(12) United States Patent
Veselka, Jr. et al.

(10) Patent No.: US 8,433,193 B2
(45) Date of Patent: Apr. 30, 2013

(54) SYSTEMS AND METHODS FOR CHANNEL POWER OFFSETS FOR MULTI DATA RATE DWDM TRANSMISSION OVER OPTICAL ADD DROP MULTIPLEXERS

(75) Inventors: John J. Veselka, Jr., Clarksville, MD (US); Harshad Sardesai, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 839 days.

(21) Appl. No.: 12/262,869

(22) Filed: Oct. 31, 2008

(65) Prior Publication Data

US 2010/0111534 A1 May 6, 2010

(51) Int. Cl.
*H04B 10/00* (2006.01)
(52) U.S. Cl.
USPC ............... 398/38; 398/158; 398/25; 398/141
(58) Field of Classification Search .......... 398/173–181, 398/38, 141
See application file for complete search history.

(56) References Cited

U.S. PATENT DOCUMENTS

| | | | | |
|---|---|---|---|---|
| 6,687,464 B1 * | 2/2004 | Roberts et al. | ................ | 398/158 |
| 7,092,148 B1 * | 8/2006 | Haggans et al. | ......... | 359/337.11 |
| 7,505,683 B1 * | 3/2009 | Lemieux et al. | ................. | 398/4 |
| 7,680,419 B2 * | 3/2010 | Nakashima et al. | .......... | 398/177 |
| 7,725,042 B2 * | 5/2010 | Young et al. | ................. | 398/177 |
| 7,912,370 B2 * | 3/2011 | Nakamura | ..................... | 398/38 |
| 2006/0291859 A1 * | 12/2006 | Young et al. | .................... | 398/58 |
| 2011/0038627 A1 * | 2/2011 | Ciaramella et al. | ............. | 398/38 |
| 2011/0052188 A1 * | 3/2011 | Feldman | ........................ | 398/34 |

* cited by examiner

*Primary Examiner* — Agustin Bello
(74) *Attorney, Agent, or Firm* — Clements Bernard PLLC; Christopher L. Bernard; Lawrence A. Baratta, Jr.

(57) ABSTRACT

The present disclosure provides systems and methods for channel power offsets for multi-rate dense wave division multiplexed (DWDM) transmission over optical add-drop multiplexers (OADMs). The present invention includes algorithms to set power levels of each type of channel in different sections of a fiber system to optimize the performance of that type of channel at the receiver. For example, the present invention can optimize power levels based on different channel modulation formats, bit rates, channel spacings, and the like. Advantageously, the present invention improves the total capacity (bit rate) and reach that channels of a given bit rate can achieve, and maximizes the reach of channels without sacrificing capacity.

18 Claims, 6 Drawing Sheets

SYSTEMS AND METHODS FOR CHANNEL POWER OFFSETS FOR MULTI DATA RATE DWDM TRANSMISSION OVER OPTICAL ADD DROP MULTIPLEXERS

FIELD OF THE INVENTION

The present invention relates generally to optical communication systems. More particularly, the present invention provides systems and methods for providing optical channel power offsets for multi-rate dense wave division multiplexed (DWDM) transmission over optical add-drop multiplexers (OADMs) and the like.

BACKGROUND OF THE INVENTION

To satisfy increased demand for bandwidth on current and future lightwave systems, new modulation formats are being developed that provide higher bit rates and greater spectral efficiency. Exemplary new modulation formats include differential phase shift keying (DPSK), differential quadrature phase shift keying (DQPSK), and the like. Referring to FIG. 1, on currently deployed systems, such as an optical system 10, these new modulation formats will be deployed with older modulation formats. For example, the optical system 10 includes terminals 12, 14 with intermediate optical add-drop multiplexers (OADMs) 16, 18, 20, 22. In the optical system 10, there are existing 10G channels 24 with 40G channels 26, 28, 30 of two different modulation formats, i.e. 40G channel 28 is DPSK, and 40G channel 30 is duo-binary (DB). Accordingly, in the future 40G channels with other modulation formats will be added to the optical system 10 as well as 100G channels and the like. Also, as shown in the optical system 10, the combination of channel types (bit rate and modulation format) will change between optical add-drop multiplexers (OADM) 16, 18, 20, 22.

In general, different modulation formats have different sensitivities to optical signal-to-noise ratio (OSNR) and different tolerances to fiber non-linear impairments. Also, their tolerance to non-linear fiber impairments differ among different types of optical transmission fiber, e.g. Non-Dispersion Shifted Fiber (NSDF), Truewave, Large Effective Area Fiber (LEAF), Lambda Shifted (LS), and the like. Because of these differences, optimization of performance (i.e., reach) of each modulation format requires that channels of different formats be launched at different channel powers. The optimum launch channel power depends on the channel type (bit rate and modulation format) and fiber type. Therefore, as channels propagate through the optical system 10, the power of a channel of a given bit rate and modulation format should be changed when it reaches a fiber of a different type. Also, to achieve optimal performance for all channels, the amount of change could differ from one channel type to another.

Currently, if several different types of channels are propagating together in the same system and they see a change in fiber type then all of their powers are changed by the same amount, in dB, to account for the differences in tolerance to non-linear fiber impairments in the second fiber type. This is done even though channels of different bit rates and modulation formats might, optimally, be changed by different amounts in the second fiber to optimize performance. If the power of a channel is less than optimum at some places between its source and destination then the performance and/or reach of the channel is reduced because the OSNR at the receiver is reduced. Conversely, if the power of a channel is higher than optimum at some places between its source and destination then the performance and/or reach of the channel is reduced because of higher penalties that are due to fiber non-linear impairments.

Conventionally, there are no algorithms which automatically set the power of a channel according to the channel type and fiber type.

BRIEF SUMMARY OF THE INVENTION

In various exemplary embodiments of the present invention, the present invention provides systems and methods for providing optical channel power offsets for multi-rate dense wave division multiplexed (DWDM) transmission over optical add-drop multiplexers (OADMs). The present invention includes algorithms to set optical power levels of each type of channel in different sections of a fiber system to optimize the performance of that type of channel at the receiver. Advantageously, the present invention improves the total capacity (bit rate) and reach that channels of a given bit rate can achieve, and maximizes the reach of channels without sacrificing capacity.

In an exemplary embodiment of the present invention, an optical channel power offset method includes dividing an optical network into one or more sections, wherein a section of the one or more sections includes a start point in the optical network where a power of each optical channel can be adjusted individually to an end point including a next point in the optical network where the power of each optical channel can be adjusted individually; adding an optical channel to one or more of the one or more sections; determining a channel type of the optical channel, wherein the channel type includes one of a plurality of channel types; and calculating a power of the optical channel for each of the one or more sections which the optical channel is added to depending on the channel type. The optical channel power offset method can further include setting the optical channel to the calculated power for each of the one or more sections which the optical channel is added to. Additionally, the optical channel power offset method can further include determining a fiber type for each span in the one or more sections, wherein the fiber type includes one of a plurality of fiber types; wherein the calculating step further includes calculating the power of the optical channel for each of the one or more sections which the optical channel is added to depending on the fiber type of the one or more sections. The determining a fiber type step includes interrogating a plurality of line optical amplifiers. The optical channel power offset method can further include determining a channel power that optimizes reach of each of the plurality of channel types in each of the plurality of fiber types; and storing determined channel powers for each of the plurality of channel types in each of the plurality of fiber types. Optionally, the determining step is responsive to one or more of system performance measurements and channel modeling over each of the plurality of fiber types. Alternatively, the optical channel power offset method can further include rounding each of the determined channel powers to the nearest dB. The calculating step includes utilizing the determined channel powers for each of the plurality of channel types in each of the plurality of fiber types and the fiber type for each span in the one or more sections to compute an averaged channel power for the optical channel. The optical channel power offset method can further include operating the optical network with existing channels including 10G on-off keying modulation; wherein the optical channel in the adding step includes a modulation format different from the existing channels. Optionally, the optical channel includes one of 40G Duo-Binary, 40G NRZ-DPSK, 40G RZ-DPSK, 40G RZ-DQPSK, 100G Duo-Binary, 100G NRZ-DSPK, 100G RZ-DPSK, 100G RZ-DQPSK, and others. The optical channel can traverse different sections of the one or more sections from the existing channels. Optionally, the start point and the end point include locations that includes individual channel power adjustment mechanisms. These locations could include a terminal, optical add/drop multiplexer and a dynamic gain equalizer. The optical channel power offset method can be performed by one of a network management system, an element management system, and a controller.

In another exemplary embodiment of the present invention, a method for channel power offset mechanism for multiple channel-type DWDM transmission over optical add drop multiplexers in an optical network includes dividing the optical network into j sections, wherein j is an integer; taking inventory of fiber type of a plurality of fiber types for each span in the optical network; determining a channel type of a plurality of channel types of an optical channel; for each section, j, calculating the optical channel power according to the formula of $$\text{Chan\_Power}_j = \frac{1}{N_j} \sum_i \text{Number\_Spans\_Type}_{j,i} \times \text{FT\_Power}_i,$$

wherein $N_j$ is the total number of fiber spans in section j, $\text{Number\_Spans\_Type}_{j,i}$ is the number of spans of fiber type i in section j based on the taking inventory step, $\text{FT\_Power}_i$ is a predetermined value for each channel type of the plurality of channel types and for each fiber type of the plurality of fiber types, and the summation is over all fiber types, i, in section j. Each of the j sections includes a path in the optical network where individual optical channel powers are adjustable at endpoints of the path. Optionally, $\text{FT\_Power}_i$ is predetermined responsive to one or more of system performance measurements and channel modeling over each of the plurality of fiber types. The optical channel can include one of 40G Duo-Binary, 40G NRZ-DPSK, 40G RZ-DPSK, 40G RZ-DQPSK, 100G Duo-Binary, 100G NRZ-DSPK, 100G RZ-DPSK, 100G RZ-DQPSK, and others; and wherein the optical channel traverses different sections of the one or more sections from existing channels in the optical network.

In yet another exemplary embodiment of the present invention, an optical network including a channel power offset mechanism for multiple channel-type DWDM transmission over optical add drop multiplexers includes a first terminal; one or more optical amplifier sites; one or more optical add-drop multiplexer sites; a second terminal connected to the first terminal through the one or more optical amplifier sites and the one or more optical add-drop multiplexer sites; means for dividing the first terminal, the one or more optical amplifier sites, the one or more optical add-drop multiplexer sites, and the second terminal into sections; means for computing optical channel power for each of the sections responsive to channel modulation format, channel bit rate, channel spacing, and fiber types. Each of the sections includes a path in the optical network where individual optical channel powers are adjustable at endpoints of the path. Optionally, the optical network includes existing 10G on-off keying channels between the first terminal and the second terminal; and one or more optical channels including a modulation format different from the existing channels between any of the first terminal and the one or more optical add-drop multiplexer sites.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments of the present invention, the present invention provides systems and methods for providing optical channel power offsets for multi-rate dense wave division multiplexed (DWDM) transmission over optical add-drop multiplexers (OADMs). The present invention includes algorithms to set power levels of each type of channel in different sections of a fiber system to optimize the performance of that type of channel at the receiver. Advantageously, the present invention improves the total capacity (bit rate) and reach that channels of a given bit rate can achieve, and maximizes the reach of channels without sacrificing capacity.

Figure 1:
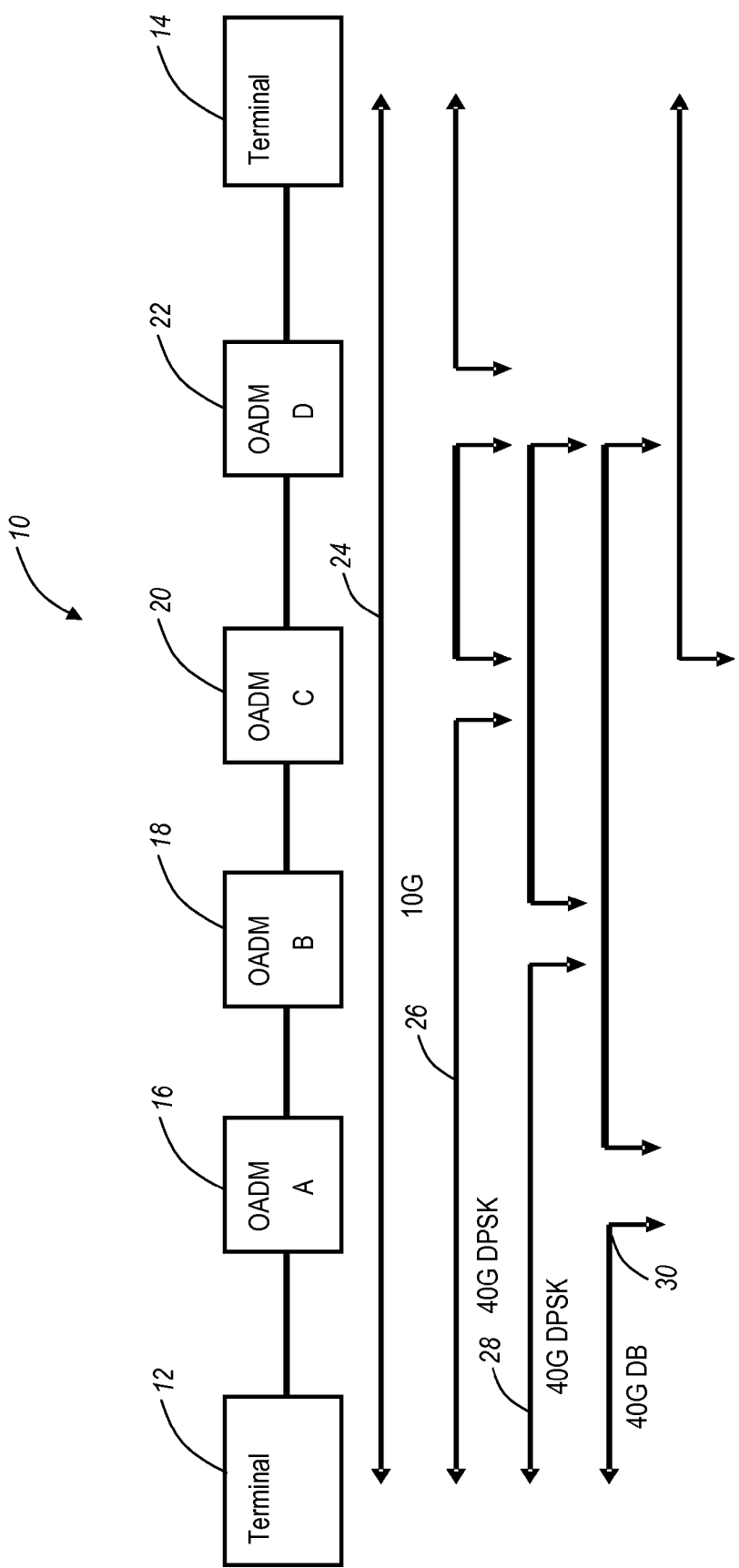
FIG. 1 is an optical systems with terminals and optical add-drop multiplexers (OADMs) illustrating new modulation formats deployed with older modulation formats.
Figure 2:
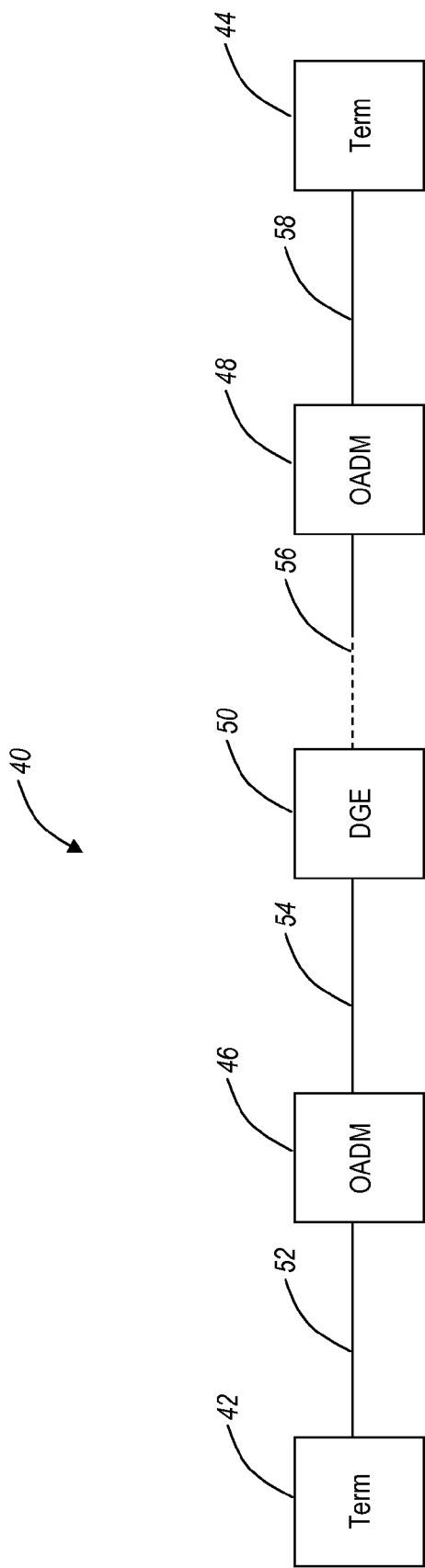
FIG. 2 is a reference optical network according to an exemplary embodiment of the present invention.

Referring to FIG. 2, a reference optical network 40 is illustrated according to an exemplary embodiment of the present invention. The reference optical network 40 includes terminal 42, 44, OADMs 46, 48, and a dynamic gain equalizer (DGE) 50. The terminals 42, 44 are configured to provide one or more DWDM channels, and the terminals 42, 44 can include a LH/ULH DWDM platform, a metro/regional DWDM platform, an optical switch, a multi-service provisioning platform (MSPP), a data switch/router, or the like. The OADMs 46, 48 can be remotely configurable, i.e. a ROADM, and are configured to add/drop channels to the optical network 40. The DGE 50 is configured to provide dynamic gain equalization across the optical spectrum. For example, the DGE 50 could be located at an optical amplifier site, i.e. at a mid-stage of an optical amplifier. Note, the reference optical network 40 could include other components, such as optical amplifiers, multiplexers/demultiplexers, and the like which are omitted for illustration purposes.

The reference network 40 includes a plurality of sections 52, 54, 56, 58 interconnecting the terminals 42, 44, the OADMs 46, 48, and the DGE 50. In the present invention, the sections 52, 54, 56, 58 are defined as beginning at a point where the power of each optical channel can be adjusted individually and ending at the next point in the network 40 where each optical channel can be adjusted individually. For example, terminals 42, 44 can support adjustment of individual channel powers through tunable variable optical attenuators (VOAs) or the like. Similarly, OADMs 46, 48 can also include tunable VOAs, such as on add/drop ports, through pixels on reconfigurable blocking filters (RBF), through a wavelength selective switch (WSS), or the like. The DGE 50 can be configured to adjust the entire optical spectrum providing individual channel power adjustment.

The present invention considers two types of sections; a single-type section and a multi-type section. A single-type section contains only one type of optical fiber and a multi-type section contains more that one type of optical fiber. For example, the sections 52, 54, 58 are single-type sections, and the section 56 is a multi-type section. In addition to optical fiber, each of the single-type section and the multi-type section can include other components, such as optical amplifiers, OADMs, and the like, which are components which are not configured to provide individual channel power adjustment.

When channels of a particular type, X, enter a single-type section, j, the powers of all channels of that type, Chan_Type_X_Power$_j$, are set to the value FT_X_Power$_i$, that is:

$$\text{Chan\_Type\_X\_Power}_j = \text{FT\_X\_Power}_i \quad (1)$$

where the value FT_X_Power$_i$ is the channel power that optimizes the reach of channel type X in fiber type i. Channel types are, for example, 10G Non-Return-to-Zero (NRZ), 40G Duo-Binary, 40G NRZ-DPSK, 40G RZ-DPSK, 40G RZ-DQPSK, etc. Fiber types are, for example, NDSF, Non-Zero Dispersion Shifted Fiber (NZDSF), LS, LEAF, Truewave, and the like. FT_X_Power$_i$ is determined as a result of system performance measurements and modeling of channel type X in fiber type i and is a predetermined value, i.e. the present invention contemplates predetermining the values of FT_X_Power$_i$ for all channel types and fiber types used in a system.

When channels of a particular type, X, enter a multi-type section, j, the powers of all channels of that type are set by a weighted average according to:

$$\text{Chan\_Type\_X\_Power}_j = \frac{1}{N_j} \sum_i \text{Number\_Spans\_Type}_{j,i} \times \text{FT\_X\_Power}_i \quad (2)$$

where $N_j$ is the total number of fiber spans in section j, Number_Spans_Type$_{j,i}$ is the number of spans of fiber type i in section j and the summation is over all fiber types, i (NDSF, LS, LEAF, Truewave, etc.) in section j. A single-type section is just a special case of a multi-type section and it can be seen that Equation (2) becomes Equation (1) when all the fibers of a section are of the same type.

Figure 3:
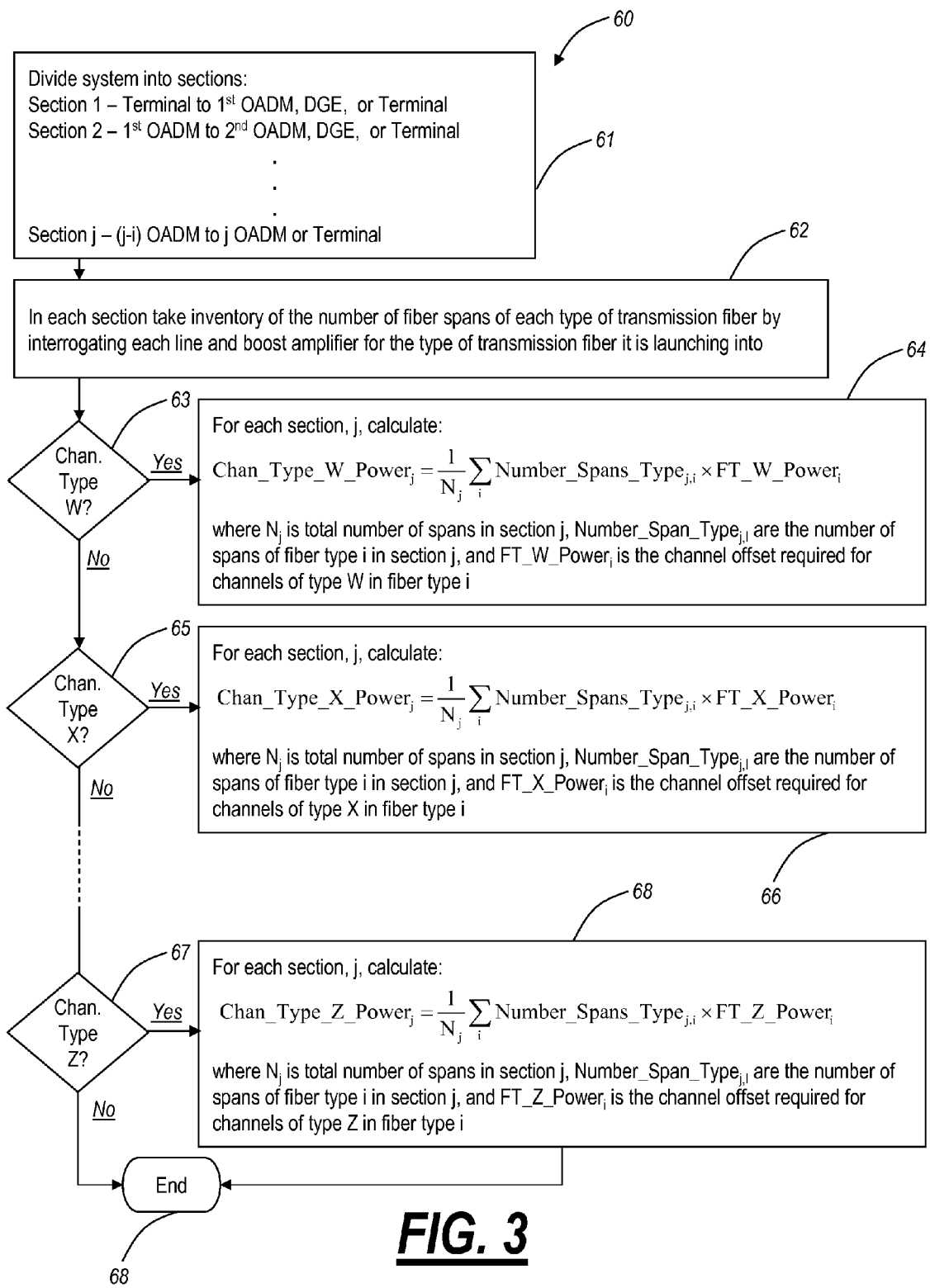
FIG. 3 is a flowchart of a channel power offset mechanism for a DWDM system according to an exemplary embodiment of the present invention.

Referring to FIG. 3, a flowchart illustrates a channel power offset mechanism 60 for a DWDM system according to an exemplary embodiment of the present invention. The channel power offset mechanism 60 can be implemented on a computer, such as a network management system (NMS), element management system (EMS), and the like, a controller located on a network element, or the like. Additionally, the channel power offset mechanism 60 can be run periodically as new channels are added to an existing system to optimize channel powers. The channel power offset mechanism 60 can provide an automatic adjustment or a list of channel powers for a user to manually adjust.

The channel power offset mechanism 60 starts by dividing the DWDM system into one or more sections (step 61). For example, assume the system includes j sections. Section one could include a terminal to a first OADM, DGE, or terminal, section two could include a first OADM to a second OADM, DGE, or terminal, and section j could include a (j-1) OADM to a j$^{th}$ OADM or terminal. As described herein, the section determination divides the system into the shortest parts where individual channel powers can be adjusted at both ends.

In each section, inventory is taken of the number of fiber spans of each type of transmission fiber, such as by interrogating each line and boost amplifier for the type of transmission fiber it is launching into (step 62). Here, optical amplifiers include information regarding the type of transmission fiber they are transmitting into. Additionally, a section can include multiple optical amplifiers, i.e. an optical amplifier without a DGE is not considered an endpoint for a section. This step provides the channel power offset mechanism 60 with fiber information for each section. Note, the interrogating can include communication over an optical service channel (OSC), data communication network (DCN), or the like to each amplifier. Further, the channel power offset mechanism 60 can include a module to query all amplifiers in parallel automatically, for example.

After the system is divided into sections and fiber types are determined for each section, the channel power offset mechanism 60 calculates channel power for each type of channel. For example, assume the system includes channel types W, X, . . . , and Z, where W, X, and Z each correspond to a channel type, i.e. bit rate, channel spacing, modulation format, etc. The system can include multiple channel types, i.e. more than W, X, and Z. As described herein, each channel type has an FT_ChannelType_Power$_i$ which can be determined as a result of system performance measurements and modeling of each channel type in each fiber type i. Specifically, FT_ChannelType_Power$_i$ is a predetermined modeled value used by the channel power offset mechanism 60 as needed.

The channel power offset mechanism 60 is configured to operate on a single channel at a time over the system. Accordingly, each operation of the channel power offset mechanism 60 provides power calculations for one channel type over each of the sections. Those of ordinary skill in the art will recognize that the channel power offset mechanism 60 can be parallelized to operate on all channels over all sections simultaneously.

The channel power offset mechanism 60 checks to see if the channel type is of channel type W in the system (step 63). If so, then for each section, j, over which the channel type W traverses, calculate the channel power as:

$$\text{Chan\_Type\_W\_Power}_j = \frac{1}{N_j} \sum_i \text{Number\_Spans\_Type}_{j,i} \times \text{FT\_W\_Power}_i$$

where $N_j$ is total number of spans in section j, Number_Span_Type$_{j,i}$ are the number of spans of fiber type i in section j, and FT_W_Power$_i$ is the channel offset required for channels of type W in fiber type i (step 64).

The channel power offset mechanism 60 checks to see if the channel type is of channel type X in the system (step 65). If so, then for each section, j, over which the channel type X traverses, calculate the channel power as:

$$\text{Chan\_Type\_X\_Power}_j = \frac{1}{N_j} \sum_i \text{Number\_Spans\_Type}_{j,i} \times \text{FT\_X\_Power}_i$$

where $N_j$ is total number of spans in section j, Number_Span_Type$_{j,i}$ are the number of spans of fiber type i in section j, and FT_X_Power$_i$ is the channel offset required for channels of type X in fiber type i (step 66).

The channel power offset mechanism 60 can continue for multiple different channel types as required. The present invention contemplates numerous different channel types as modulation formats, channel spacings, and bit rates evolve. Finally, the channel power offset mechanism 60 checks to see if the channel type is of channel type Z in the system (step 67). If so, then for each section, j, over which the channel type Z traverses, calculate the channel power as:

$$\text{Chan\_Type\_Z\_Power}_j = \frac{1}{N_j} \sum_i \text{Number\_Spans\_Type}_{j,i} \times \text{FT\_Z\_Power}_i$$

where $N_j$ is total number of spans in section j, Number_Span_Type$_{j,i}$ are the number of spans of fiber type i in section j, and FT_Z_Power$_i$ is the channel offset required for channels of type Z in fiber type i (step 68). The channel power offset mechanism 60 is complete (step 68).

Figure 4:
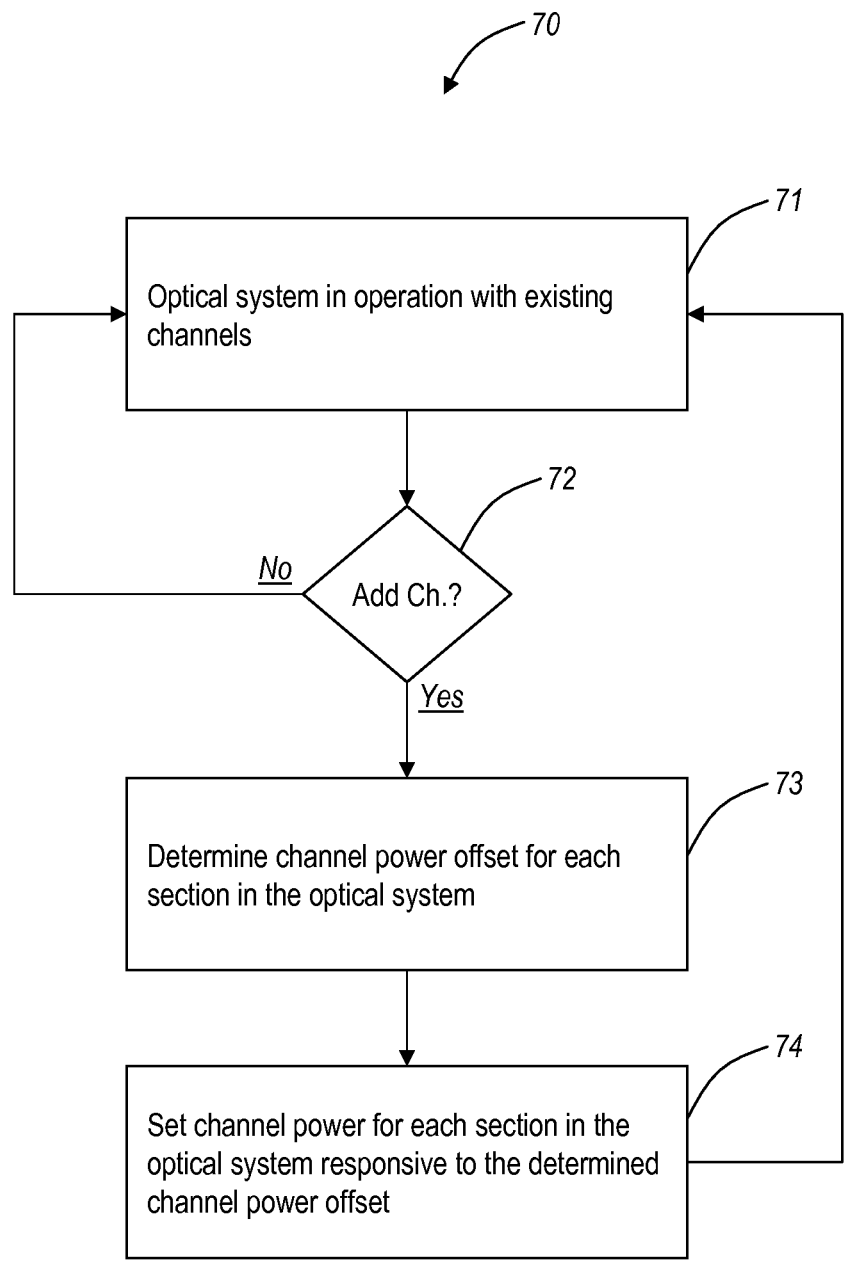
FIG. 4 is a flowchart of an exemplary operation of the channel power offset mechanism of FIG. 3 in a DWDM system with multiple sections and multiple channels of differing types according to an exemplary embodiment of the present invention.

Referring to FIG. 4, a flowchart illustrates an exemplary operation 70 of the channel power offset mechanism 60 of FIG. 3 in a DWDM system with multiple sections and multiple channels of differing types according to an exemplary embodiment of the present invention. An optical system is operating with existing channels (step 71). The optical system can include a DWDM system with terminals, OADMs, optical amplifiers, optical amplifiers with DGEs, ROADMs, and the like. The existing channels can include existing 10G channels with traditional NRZ OOK modulation or new types of modulation at higher bit rates.

The optical system operates until a new channel is added (step 72). When adding a new channel, the exemplary operation 70 determines channel power offset for each section in the optical system (step 73). Specifically, the exemplary operation 70 utilizes the mechanisms described herein, such as the channel power offset mechanism 60 in FIG. 3. After the channel powers are determined for each section, the channel power is set for each section in the optical system responsive to the determined channel offset power (step 74). The channel power can be set automatically or manually. For example, a command can be sent from an NMS/EMS which performs the channel power offset mechanism to each element in the sections to set the channel power accordingly. Alternatively, the channel powers can be set manually by a network operator. For example, the channel power offset mechanism can display a power setting which an operator uses to manually set each element in the sections. As described herein, the elements can include VOAs, RBFs, DGEs, or the like to individually adjust channel power of a single wavelength amongst multiple wavelengths.

In general, in an optical system there could be OADMs, optical amplifiers, and the like at which channel powers could not be individually adjusted. According to the above definition of a section these OADMs, optical amplifiers, etc. fall within a section, i.e. not at a section boundary. The channel power for channels of type X in a single-type and multi-type sections could still be given by equations (1) and 2, respectively, however, in the case of a multi-type section $N_j$ and Number_Spans_Type$_{j,i}$ would take on different values. For a channel that is received at this OADM $N_j$ equals the number of fiber spans between the beginning of section j and the OADM, Number_Spans_Type$_{j,i}$ is the number of spans of fiber type i between the beginning of section j and the OADM and the summation is over all fiber types, i (NDSF, LS, LEAF, etc.), between the beginning of section j and the OADM. And, for a channel that is transmitted from this OADM $N_j$ equals the number of fiber spans between the OADM and the end of section j, Number_Spans_Type$_{j,i}$ is the number of spans of fiber type i between the OADM and the end of section j and the summation is over all fiber types, i, between the OADM and the end of section j.

Optionally, modifications could be made to the channel power offset mechanisms described herein to simplify implementation. However, these simplifications would be at the expense of channel performance and, therefore, should be implemented only if the degradation of performance is small. One of these could be to round the values of the Chan_Type_X_Power$_j$ to the nearest dB. A second simplification could be for those cases of an OADM within a multi-type section in which the values of Chan_Type_X_Power$_j$ could be set to the same value of a channel of the same type that traverses the entire section. A third possible simplification could be applied if the set of FT_X_Power$_i$ for two or more channel types X are similar. In this case these channel types could be treated as one channel type.

Figure 5:
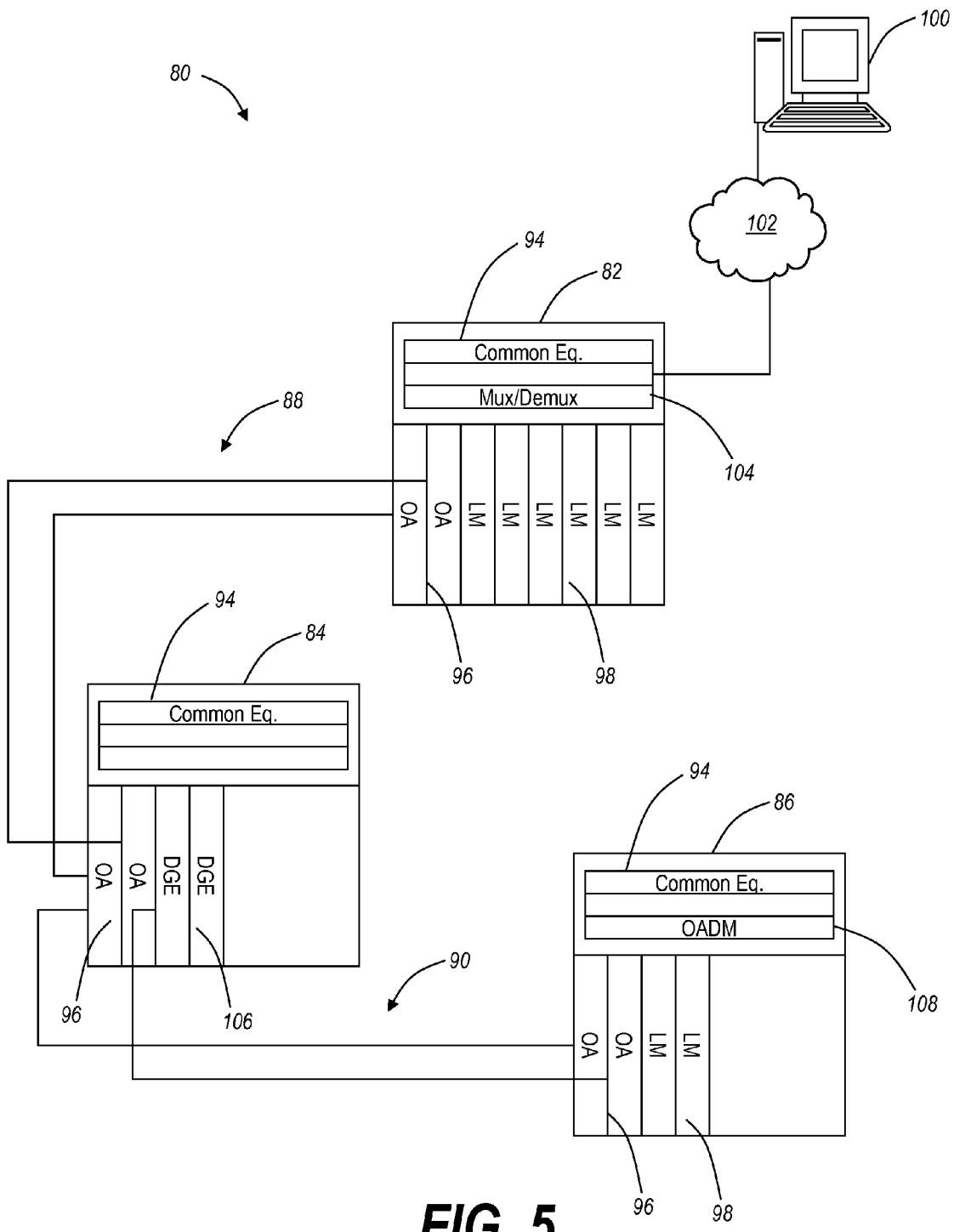
FIG. 5 is a network with a terminal, an optical amplifier, and an OADM in two sections according to an exemplary embodiment of the present invention.

Referring to FIG. 5, a network 80 is illustrated with a terminal 82, an optical amplifier 84, and an OADM 86 in two sections 88, 90 according to an exemplary embodiment of the present invention. The terminal 82 includes common equipment 94, optical amplifier modules 96, multiple line modules 98, and the like. For example, the various components 94, 96, 98 can be communicatively coupled through a backplane, a midplane, or the like. The common equipment 94 generally provides control of the terminal 82 for operations, administration, maintenance, and provisioning (OAM&P) tasks and the like. For example, the common equipment 94 can include an interface to an NMS/EMS 100, such as an Ethernet connection through a data communication network (DCN) 102. Additionally, the common equipment 94 can communicate to the optical amplifier 84 and the OADM 86 through various mechanisms, such as an optical service channel (OSC) or the like, enabling the NMS/EMS 100 to communicate with the optical amplifier 84 and the OADM 86 for OAM&P tasks.

The line modules 98 provide DWDM interfaces. For example, each line module 98 can include multiple client ports and line ports to convert client signals to DWDM. Those of ordinary skill in the art will recognize the terminal 82 could also be an optical switch, a MSPP, a SONET/SDH platform, a router/switch, and the like with DWDM interfaces. The terminal 82 can also include a multiplexer/demultiplexer 104 which is configured to connect to inputs and outputs of the multiple line modules 98 to multiplex and demultiplex optical channels from the section 88. The multiplexer/demultiplexer 104 can include mechanisms to adjust individual channel powers, such as, for example, through a tunable VOA. The tunable VOA can be remotely controlled, such as, through the NMS/EMS 100. The optical amplifier modules 96 can provide post/pre amplification for the section 88. Note, the terminal 82 can also include dispersion compensation and the like which are omitted for illustration purposes.

The optical amplifier modules 96 are connected to the multiplexer/demultiplexer 104, and are configured to provide optical amplification of multiple optical channels. For example, the optical amplifier modules 96 can include an erbium doped fiber amplifier (EDFA) or the like. The section 88 is a fiber link between the terminal 82 and the optical amplifier 84. As described herein, the section 88 can include one fiber type or multiple fiber types.

The optical amplifier 84 is connected to the terminal 82 through the section 88. The optical amplifier includes optical amplifier modules 96, such as in a mid-stage configuration with DGE modules 106 connected to the optical amplifier modules 96. The DGE modules 106 are configured to dynamically adjust power levels of individual optical channels to reduce ripple. However, the DGE modules 105 understand that the power in each channel does, in general, differ from the power of other channels and consider this when correcting ripple. Note, the network 80 can also include optical amplifier 84 sites without the DGE modules 106. As described herein, these would be located within a section, and not at a section boundary.

The optical amplifier 84 connects to the OADM 86 through the section 90. The OADM 86 includes optical amplifier modules 96, line modules 98, and an OADM module 108. The OADM module 108 is configured to receive all of the optical channels from the section 90, and to add/drop select channels. Additionally, the OADM module 108 can individually adjust power levels of the optical channels. The OADM modules 108 can be any technology known in the art, such as a wavelength selective switch, wavelength blockers, and the like.

The optical amplifier 84 and the OADM 86 also include their own common equipment 94. The common equipment 94 can include a controller element with a processor, memory, data storage, input/output, and a network interface communicatively coupled through a local interface. The common equipment 94 generally communicates to each component on the terminal 82, the optical amplifier 84, and the OADM 86.

In an exemplary embodiment of the present invention, the channel power offset mechanisms described herein can be operated by the NMS/EMS 100 and/or the common equipment 94 for the sections 88, 90 and various channels added through line modules 98. Those of ordinary skill in the art will recognize that the network 80 is shown for illustration purposes, and that the present invention is contemplated with other network types, i.e. optical switches, routers/switches, metro WDM, SONET/SDH platforms. Further, the channel power offset mechanism of the present invention can be utilized on with any network that includes devices for individual power adjustments at different sections.

Figure 6:
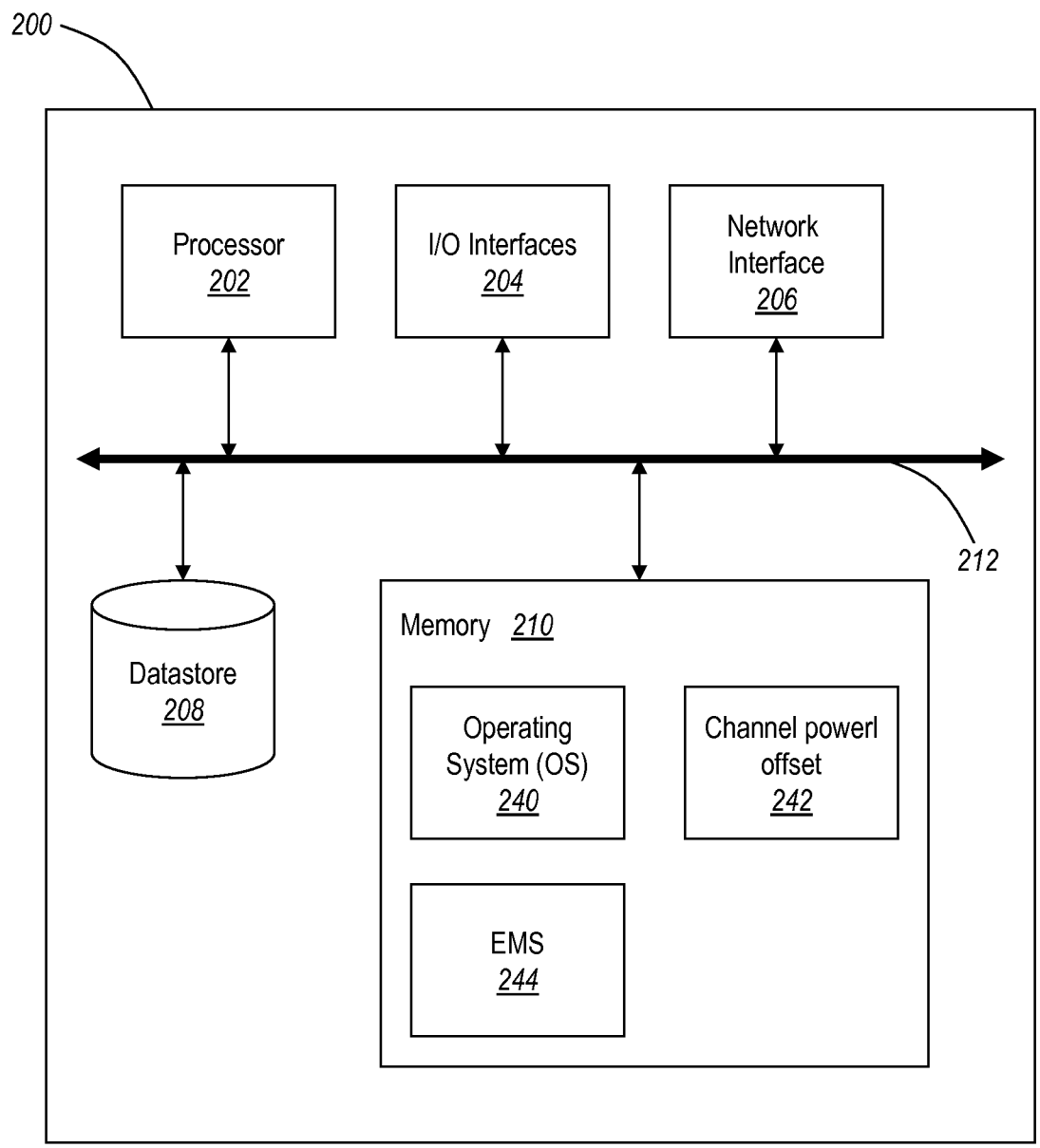
FIG. 6 is a server/controller for providing channel power offsets according to an exemplary embodiment of the present invention.

Referring to FIG. 6, a block diagram illustrates a server/controller 200 for providing channel power offsets according to an exemplary embodiment of the present invention. The server/controller 200 can be a digital computer that, in terms of hardware architecture, generally includes a processor 202, input/output (I/O) interfaces 204, network interfaces 206, memory 210, and a data store 208. The components (202, 204, 206, 208, and 210) are communicatively coupled via a local interface 212. The local interface 212 can be, for example but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server/controller 200, a semiconductor-based microprocessor (in the form of a microchip or chip set), or generally any device for executing software instructions. When the server/controller 200 is in operation, the processor 202 is configured to execute software stored within the memory 210, to communicate data to and from the memory 210, and to generally control operations of the server/controller 200 pursuant to the software instructions.

The I/O interfaces 204 can be used to receive user input from and/or for providing system output to one or more devices or components. User input can be provided via, for example, a keyboard and/or a mouse. System output can be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface. If the server/controller 200 is a controller in a network element, the I/O interfaces 204 can include a backplane, midplane, etc. connection to communicate with various modules within the network element.

The network interfaces 206 can be used to enable the server/controller 200 to communicate on a network. For example, the server/controller 200 can utilize the network interfaces 206 to communicate to network elements, other EMS/NMS systems, and the like. Each network element can include a network interface to communicate to the server/controller 200 for OAM&P. Alternatively, one or more network elements can connect to the network interfaces 206 with the one or more network elements providing access to the server/controller 200 through various mechanisms, such as an OSC, overhead bytes, and the like. The network interfaces 206 can include, for example, an Ethernet card (e.g., 10BaseT, Fast Ethernet, Gigabit Ethernet) or a wireless local area network (WLAN) card (e.g., 802.11a/b/g/n). The network interfaces 206 can include address, control, and/or data connections to enable appropriate communications on the network.

A data store 208 can be used to store data, such as channel power information and predetermined $FT\_X\_Power_i$ settings for different channel types, fiber types, etc. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server/controller 200 such as, for example, an internal hard drive connected to the local interface 212 in the server/controller 200.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 can have a distributed architecture, where various components are situated remotely from one another, but can be accessed by the processor 202.

The software in memory 210 can include one or more software programs, each of which includes an ordered listing of executable instructions for implementing logical functions. In the example of FIG. 6, the software in the memory system 210 includes a suitable operating system (O/S) 240, a channel power offset program 242, and an EMS program 244. The operating system 240 essentially controls the execution of other computer programs, such as the channel power offset program 242 and the EMS program 244, and provides scheduling, input-output control, file and data management, memory management, and communication control and related services. The operating system 240 can be any of Windows NT, Windows 2000, Windows XP, Windows Vista (all available from Microsoft, Corp. of Redmond, Wash.), Solaris (available from Sun Microsystems, Inc. of Palo Alto, Calif.), or LINUX (or another UNIX variant) (available from Red Hat of Raleigh, N.C.).

The server/controller 200 can operate as an EMS, NMS, or the like operable to manage network elements in a network. For example, the server/controller 200 can include the EMS program 244 loaded in the memory 210. The EMS program 244 can provide OAM&P access to the network elements. The server/controller 200 can include multiple EMS programs 244 to allow OAM&P access to multiple NE types. Alternatively, the server/controller 200 can operate as a network element controller configured to manage a single network element for OAM&P access.

In an exemplary embodiment of the present invention, the channel power offset program 242 is included on the server/controller 200. The channel power offset program 242 is configured to perform the various channel power offset mechanisms described herein, such as the channel power offset mechanism 60 in FIG. 3. Additionally, the channel power offset program 242 can automatically set channel powers responsive to power determinations through various OAM&P mechanisms.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical channel power offset method, comprising:
dividing an optical network into one or more sections, wherein a section of the one or more sections comprises a start point in the optical network where a power of each optical channel can be adjusted individually to an end point comprising a next point in the optical network where the power of each optical channel can be adjusted individually;
adding an optical channel to one or more of the one or more sections;
taking inventory of fiber type for each span in the optical network, wherein the fiber type comprises one of a plurality of fiber types;
determining a channel type of the optical channel, wherein the channel type comprises one of a plurality of channel types;
calculating a power of the optical channel for each of the one or more sections which the optical channel is added responsive to the channel type;
wherein the optical channel power offset method is performed by one or more of a network management system, an element management system, and a controller;
wherein some optical channels traverse different sections between the start point and the end point;
for each section, j, and channel type X calculating the optical channel power according to the formula of $$\text{Chan\_Type\_X\_Power}_j = \frac{1}{N_j} \sum_i \text{Number\_Spans\_Type}_{j,i} \times \text{FT\_X\_Power}_i,$$

wherein $N_j$ comprises a total number of fiber spans in section j, Number\_Spans\_Type$_{j,i}$ is the number of spans of fiber type i in section j based on the taking inventory step, FT\_X\_Power$_i$ is a predetermined value for each channel type X of the plurality of channel types and for each fiber type of the plurality of fiber types, and the summation is over all fiber types, i, in section j.

2. The optical channel power offset method of claim 1, further comprising:
setting the optical channel to the calculated power for each of the one or more sections which the optical channel is added to.

3. The optical channel power offset method of claim 1, further comprising:
determining a fiber type for each span in the one or more sections, wherein the fiber type comprises one of a plurality of fiber types;

wherein the calculating step further comprises calculating the power of the optical channel for each of the one or more sections which the optical channel is added to responsive to the fiber type of the one or more sections.

4. The optical channel power offset method of claim 3, wherein the determining a fiber type step comprises interrogating a plurality of optical amplifiers.

5. The optical channel power offset method of claim 3, further comprising:
determining a channel power that optimizes reach of each of the plurality of channel types in each of the plurality of fiber types; and
storing determined channel powers for each of the plurality of channel types in each of the plurality of fiber types.

6. The optical channel power offset method of claim 5, wherein the determining step is responsive to one or more of system performance measurements and channel modeling over each of the plurality of fiber types.

7. The optical channel power offset method of claim 5, wherein the calculating step comprises utilizing the determined channel powers for each of the plurality of channel types in each of the plurality of fiber types and the fiber type for each span in the one or more sections to compute an averaged channel power for the optical channel.

8. The optical channel power offset method of claim 1, further comprising:
operating the optical network with existing channels comprising 10G on-off keying modulation;
wherein the optical channel in the adding step comprises a modulation format different from the existing channels.

9. The optical channel power offset method of claim 8, wherein the optical channel comprises one of 40G Duo-Binary, 40G NRZ-DPSK, 40G RZ-DPSK, 40G RZ-DQPSK, 100G Duo-Binary, 100G NRZ-DSPK, 100G RZ-DPSK, and 100G RZ-DQPSK.

10. The optical channel power offset method of claim 8, wherein the optical channel traverses different sections of the one or more sections from the existing channels.

11. The optical channel power offset method of claim 1, wherein the start point and the end point comprise any of a terminal, an optical add-drop multiplexer comprising individual channel power adjustment mechanisms, and an optical amplifier comprising dynamic gain equalization.

12. A computer implemented method for a channel power offset mechanism for multiple channel type DWDM transmission over optical add drop multiplexers in an optical network, the computer implemented method stored in a non-transitory computer readable medium and comprising instructions executable by a processor, and in response to such execution causing the processor to perform operations, comprising:
dividing the optical network into j sections, wherein j comprises an integer;
taking inventory of fiber type of a plurality of fiber types for each span in the optical network;
determining a channel type of a plurality of channel types of an optical channel;
for each section, j, and channel type X calculating the optical channel power according to the formula of $$\text{Chan\_Type\_X\_Power}_j = \frac{1}{N_j} \sum_i \text{Number\_Spans\_Type}_{j,i} \times \text{FT\_X\_Power}_i,$$

wherein $N_j$ comprises a total number of fiber spans in section j, Number\_Spans\_Type$_{j,i}$ is the number of spans of fiber type i in section j based on the taking inventory step, FT_X_Power, is a predetermined value for each channel type X of the plurality of channel types and for each fiber type of the plurality of fiber types, and the summation is over all fiber types, i, in section j.

13. The method of claim 12, wherein each of the j sections comprises a path in the optical network where individual optical channel powers are adjustable at endpoints of the path.

14. The method of claim 13, wherein FT_X_Power, is predetermined responsive to one or more of system performance measurements of channel type X and channel modeling of channel type X over each of the plurality of fiber types.

15. The method of claim 13, wherein the optical channel comprises one of 40G Duo-Binary, 40G NRZ-DPSK, 40G RZ-DPSK, 40G RZ-DQPSK, 100G Duo-Binary, 100G NRZ-DSPK, 100G RZ-DPSK, and 100G RZ-DQPSK; and
wherein the optical channel traverses different sections of the one or more sections from existing channels in the optical network.

16. An optical network comprising a channel power offset mechanism for multiple channel type DWDM transmission over optical add drop multiplexers, comprising:
a first terminal;
one or more optical amplifier sites;
one or more optical add-drop multiplexer sites;
a second terminal connected to the first terminal through the one or more optical amplifier sites and the one or more optical add-drop multiplexer sites;
means for dividing the first terminal, the one or more optical amplifier sites, the one or more optical add-drop multiplexer sites, and the second terminal into sections;
means for computing optical channel power for each of the sections responsive to channel modulation format, channel bit rate, channel spacing, and fiber types;
wherein some optical channels traverse different sections between the first terminal and the second terminal;
wherein the means for computing optical channel power comprise means for:
dividing the optical network into j sections, wherein j comprises an integer;
taking inventory of fiber type of a plurality of fiber types for each span in the optical network;
determining a channel type of a plurality of channel types of an optical channel;
for each section, j, and channel type X calculating the optical channel power according to the formula of $$\text{Chan\_Type\_X\_Power}_j = \frac{1}{N_j} \sum_i \text{Number\_Spans\_Type}_{j,i} \times \text{FT\_X\_Power}_i,$$

wherein $N_j$ comprises a total number of fiber spans in section j, Number_Spans_Type$_{j,i}$ is the number of spans of fiber type i in section j based on the taking inventory step, FT_X_Power, is a predetermined value for each channel type X of the plurality of channel types and for each fiber type of the plurality of fiber types, and the summation is over all fiber types, i, in section j.

17. The optical network of claim 16, wherein each of the sections comprises a path in the optical network where individual optical channel powers are adjustable at endpoints of the path.

18. The optical network of claim 17, wherein the optical network comprises:
existing 10G on-off keying channels between the first terminal and the second terminal; and
one or more optical channels comprising a modulation format different from the existing channels between any of the first terminal and the one or more optical add-drop multiplexer sites.

* * * * *